United States Patent
Miao et al.

(10) Patent No.: US 11,501,049 B1
(45) Date of Patent: Nov. 15, 2022

(54) SYSTEMS AND METHODS FOR MODELING INTERACTIONS OF POWER AND SIGNALS IN A MULTI-LAYERED ELECTRONIC STRUCTURE

(71) Applicant: Cadence Design Systems, Inc., San Jose, CA (US)

(72) Inventors: Feng Miao, Shanghai (CN); Jing Wang, Shanghai (CN); Zhen Mu, North Chelmsford, MA (US); Xuegang Zeng, Westborough, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 958 days.

(21) Appl. No.: 16/145,561

(22) Filed: Sep. 28, 2018

(51) Int. Cl.
*G06F 30/367* (2020.01)
*G06F 113/20* (2020.01)

(52) U.S. Cl.
CPC ........ *G06F 30/367* (2020.01); *G06F 2113/20* (2020.01)

(58) Field of Classification Search
CPC ...... G06F 30/367; G06F 113/20; G06F 30/20; G06F 30/39
See application file for complete search history.

(56) References Cited

U.S. PATENT DOCUMENTS

| | | | | |
|---|---|---|---|---|
| 7,673,260 B2 * | 3/2010 | Chen | ..................... | G06F 30/367 716/106 |
| 9,715,567 B1 * | 7/2017 | Xu | ..................... | G06F 30/367 |
| 2003/0228757 A1 * | 12/2003 | Jung | ..................... | H01L 21/76838 438/689 |
| 2005/0240883 A1 * | 10/2005 | Huang | ..................... | G06F 30/367 716/115 |
| 2007/0168173 A1 * | 7/2007 | Wu | ..................... | G06F 30/30 703/14 |
| 2008/0133201 A1 * | 6/2008 | Guedon | ..................... | G06F 30/23 703/14 |
| 2010/0218145 A1 * | 8/2010 | Engin | ..................... | G06F 30/23 716/130 |
| 2014/0012559 A1 * | 1/2014 | Sakai | ..................... | G06F 30/367 703/14 |
| 2014/0114636 A1 * | 4/2014 | Daloukas | ..................... | G06F 30/367 703/14 |
| 2016/0070837 A1 * | 3/2016 | Hidaka | ..................... | G06F 17/10 703/2 |

\* cited by examiner

*Primary Examiner* — Rehana Perveen
*Assistant Examiner* — Cuong V Luu
(74) *Attorney, Agent, or Firm* — Mark H. Whittenberger, Esq.; Holland & Knight LLP

(57) ABSTRACT

The present disclosure relates to a computer-implemented method for use in an electronic design. Embodiments may include performing, using a processor, a simulation of a multi-layered electronic structure and extracting a circuit model of the multi-layered electronic structure, wherein the circuit model includes at least two plates. Embodiments may also include extracting one or more parasitic parameters of at least one via associated with the circuit model and calculating a coupling coefficient associated with a controlled source of the circuit model. Embodiments may further include extracting a transmission line mode from the circuit model and linking the circuit model, at least one via, and the transmission line mode to an external circuit to generate a modeled system. Embodiments may also include solving the modeled system using a modified nodal analysis.

16 Claims, 17 Drawing Sheets

SYSTEMS AND METHODS FOR MODELING INTERACTIONS OF POWER AND SIGNALS IN A MULTI-LAYERED ELECTRONIC STRUCTURE

TECHNICAL FIELD

The present disclosure relates to electronic design techniques, and more specifically, to a system and method for modeling in a multi-layered electronic structure.

DISCUSSION OF THE RELATED ART

Electronic packaging refers to the physical implementations of electrical circuits of integrated circuit (IC) chips, modules, chip or module carriers, cards, boards or backplanes. Such components and devices are often referred to as electronic packaging structures. The terms "electronic packaging structure", "electronic package" and "package" are hereinafter used interchangeably to refer to any or all of the aforementioned devices and structures. For purposes of this discussion, such structures include multilayered packaging, in which a plurality of substantially parallel conductive planes (designated as ground and/or power planes) are separated from one another by non-conductive dielectric material.

It has long been the practice of digital electronic system designers to employ simulation techniques to predict the ultimate behavior of those systems before the actual hardware implementation thereof. As large-scale integration (LSI) and very large-scale integration (VLSI) techniques have allowed greater numbers of circuits to be packaged in smaller spaces, it has become increasingly difficult to construct physical prototypes of proposed digital systems prior to the actual construction of the chip. Therefore, although the simulation of proposed systems was once merely advisable, it is now necessary.

With working frequency increasing to the gigahertz range, attempts to analyze interactions between signals and electromagnetic fields inside the chip, IC package and printed circuit board to optimize the signal integrity (SI) of the system is becoming more and more important. Due to complicated electronic structures in the package and board designs, it is a great challenge for a general SPICE simulator to perform power-aware SI simulations on a system which could have packages, PCB boards, drivers and receivers with high accuracy and efficiency.

SUMMARY

In one or more embodiments of the present disclosure, a computer-implemented method is provided. The method may include performing, using a processor, a simulation of a multi-layered electronic structure and extracting a circuit model of the multi-layered electronic structure, wherein the circuit model includes at least two plates. The method may also include extracting one or more parasitic parameters of at least one via associated with the circuit model and calculating a coupling coefficient associated with a controlled source of the circuit model. The method may further include extracting a transmission line mode from the circuit model and linking the circuit model, at least one via, and the transmission line mode to an external circuit to generate a modeled system. The method may also include solving the modeled system using a modified nodal analysis.

One or more of the following features may be included. In some embodiments, the circuit model is a resistance, inductance, conductance, and capacitance ("RLGC") network. The method may further include storing one or more of the circuit model, the one or more parasitic parameters, the coupling coefficient, and the transmission line model as a subcircuit model associated with a SPICE netlist. The coupling coefficient may be based upon, at least in part, a thickness of a via. The RLGC network may be analyzed as a distributed and stacked circuit network. The method may include determining a voltage fluctuation associated with the multi-layered electronic structure using only a SPICE-based simulator. The external circuit may include at least one of a driver and a receiver.

In some embodiments, a computer-readable storage medium having stored thereon instructions that when executed by a machine result in one or more operations is provided. Operations may include performing, using a processor, a simulation of a multi-layered electronic structure and extracting a circuit model of the multi-layered electronic structure, wherein the circuit model includes at least two plates. Operations may also include extracting one or more parasitic parameters of at least one via associated with the circuit model and calculating a coupling coefficient associated with a controlled source of the circuit model. Operations may further include extracting a transmission line mode from the circuit model and linking the circuit model, at least one via, and the transmission line mode to an external circuit to generate a modeled system. Operations may also include solving the modeled system using a modified nodal analysis.

One or more of the following features may be included. In some embodiments, the circuit model is a resistance, inductance, conductance, and capacitance ("RLGC") network. Operations may further include storing one or more of the circuit model, the one or more parasitic parameters, the coupling coefficient, and the transmission line model as a subcircuit model associated with a SPICE netlist. The coupling coefficient may be based upon, at least in part, a thickness of a via. The RLGC network may be analyzed as a distributed and stacked circuit network. Operations may include determining a voltage fluctuation associated with the multi-layered electronic structure using only a SPICE-based simulator. The external circuit may include at least one of a driver and a receiver.

In one or more embodiments of the present disclosure, a system is provided. The system may include a computing device configured to perform, using a processor, a simulation of a multi-layered electronic structure and to extract a circuit model of the multi-layered electronic structure, wherein the circuit model includes at least two plates. The computing device may be further configured to extract one or more parasitic parameters of at least one via associated with the circuit model and to calculate a coupling coefficient associated with a controlled source of the circuit model. The computing device may be further configured to extract a transmission line mode from the circuit model and to link the circuit model, at least one via, and the transmission line mode to an external circuit to generate a modeled system. The computing device may be further configured to solve the modeled system using a modified nodal analysis.

One or more of the following features may be included. In some embodiments, the circuit model is a resistance, inductance, conductance, and capacitance ("RLGC") network. The computing device may be configured to store one or more of the circuit model, the one or more parasitic parameters, the coupling coefficient, and the transmission line model as a subcircuit model associated with a SPICE netlist. The coupling coefficient may be based upon, at least in part, a thickness of a via. The RLGC network may be analyzed as a distributed and stacked circuit network. The computing device may be configured to determine a voltage fluctuation associated with the multi-layered electronic structure using only a SPICE-based simulator.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure are incorporated in and constitute a part of this specification, illustrate embodiments of the present disclosure and together with the description serve to explain the principles of embodiments of the present disclosure.

DETAILED DESCRIPTION

Figure 1:
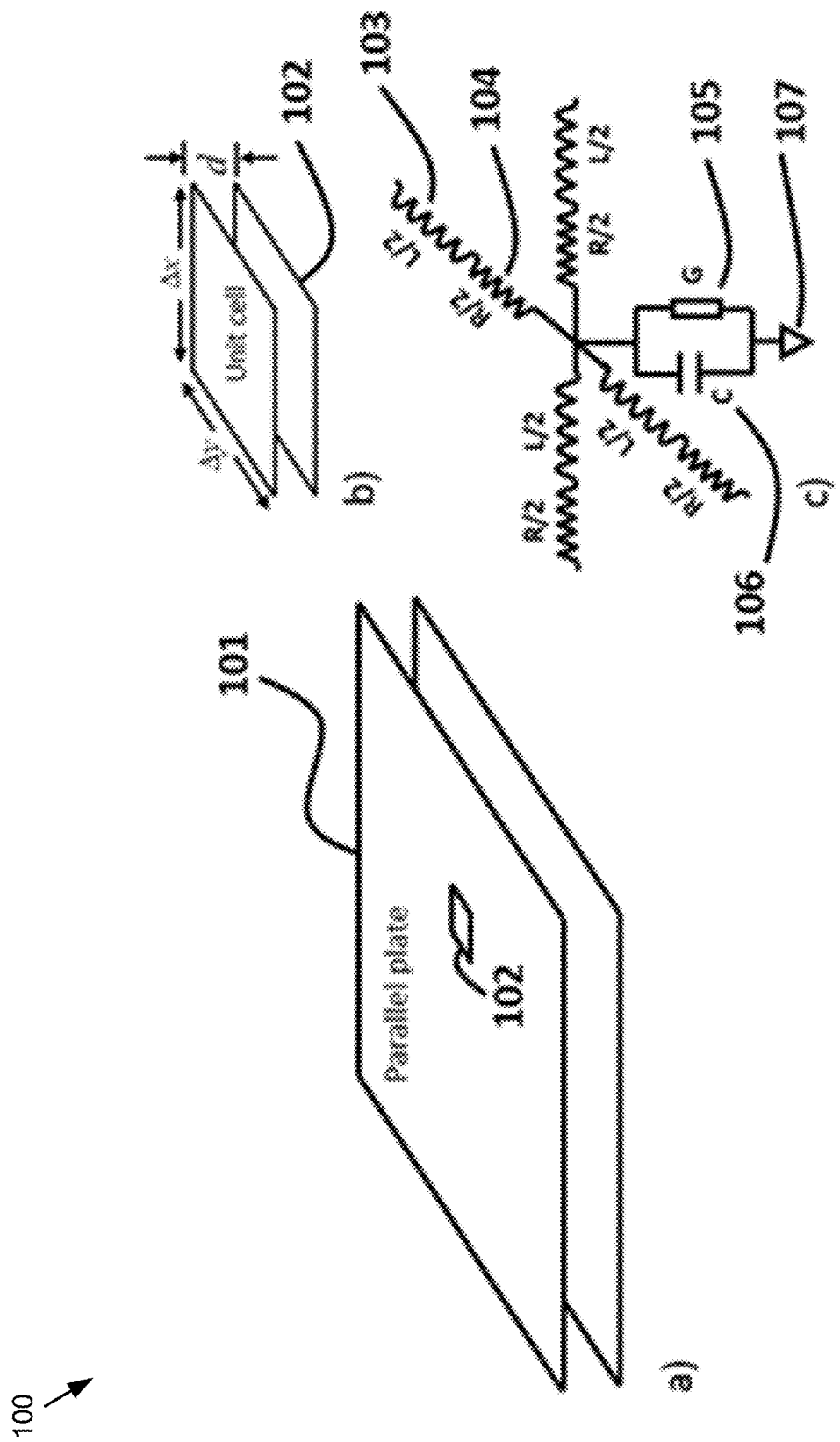
FIG. 1 is a diagram depicting aspects of the simulation process in accordance with an embodiment of the present disclosure.

Embodiments of the present disclosure are directed towards a full circuit method for modeling interactions of power and signals in multilayered electronic structures. The existing methods for power-aware SI analysis are generally referred to as analytical methods, full-wave methods and a hybrid method. The analytical method is based on solving the solution of Maxwell's equation with a proper boundary condition to obtain the dominant mode of parallel conductive plates and derive the transfer and input impedances at the driving points. This method is generally accurate, however it may only be used to analyze the parallel plates in regular shapes on multilayered package/board. The full-wave methods, such as three-dimensional ("3D") Finite Element Method (FEM) and 3D Finite Difference Time Domain (FDTD), have the ability to solve the problems with high accuracy. However, they are not suitable for analyzing the SI problems systematically because of the high consumption of memories and CPU time. The hybrid method is based on mode decoupling theory. In this particular method, the signals flowing through the vias to signal traces are analyzed using a Modified Nodal Analysis (MNA), while the electromagnetic fields propagating between power and ground planes are analyzed by 2D FDTD/FEM methods. To get an accurate solution, a 2D FDTD/FEM method, or similar methods such as the Latency Insertion Method ("LIM") method (see, e.g., *IEEE: Latency Insertion Method (LIM) for the Fast Transient Simulation of Large Networks*, Schutt-Ainé, January 2001), the Multilayered Finite Difference ("MFD") method (see, e.g., *IEEE: Designing and Modeling for Power Integrity*, Swaminathan et al., May 2010), etc., needs to be integrated with MNA, and a special time domain simulator is required to handle the circuit and electromagnetic field interaction. Embodiments of the present disclosure address many of the deficiencies of these prior approaches.

Additional information regarding FDTD-based approaches and the analysis of multilayered electronic packaging structures may be found, for example, in U.S. Pat. Nos. 5,504,423 and 5,566,083, which are each hereby incorporated by reference in their entirety.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of modeling process 10 included herein are directed towards an extension of the hybrid method discussed above. Accordingly, embodiments may include extracting the SPICE circuit models (no S-parameter) and using the general SPICE simulator for power-aware signal integrity simulations on packages, PCB boards and drivers and receivers. In contrast to the existing methods, modeling process 10 may help to reduce memory consumption, shorten CPU time, and avoid convergence issues in simulation.

Embodiments of modeling process 10 may be based on the mode decoupling theory in which the current flowing through the signal via to trace is decomposed into two parts/modes. For more information regarding the mode decoupling theory please see, U.S. Pat. No. 5,504,423 and *IEEE: Model of Interaction Between Signal Vias and Metal Planes in Electronics Packaging*, Fang et al, 1994.

In some embodiments, the first mode may be referred to as a transmission line mode which may support an equal voltage potential between the planes. The second mode may be referred to as radial electromagnetic mode which may result in a voltage fluctuation between the planes. In the hybrid method, the second mode may be computed using a 2D FDTD/FEM algorithm. In contrast, in some embodiments of modeling process 10 described herein the second mode may be computed by solving the voltages/currents of an equivalent circuit of multilayered parallel plates which may be linked through a via with dependent source.

In some embodiments, the full circuit method associated with modeling process 10 may be configured to treat the parallel planes as a distributed and stacked circuit network consisting of resistance, inductance, conductance, and capacitance ("RLGC") elements as is shown in FIG. 1. The resistance in the network describes the loss of the metal planes. The conductance denotes the loss of the medium sandwiched between two conductive planes. The lumped inductance and capacitance can explain the current response and voltage response on the planes. These parasitic parameters can be calculated approximately by Equation 1 provided below where $\sigma$ is the conductivity of the metal, $\varepsilon$, $\mu$ and $\delta$ are the real part of permittivity, permeability and loss tangent of medium, respectively. $\Delta x$ and $\Delta y$ are the size of unit cell. d and t are the thickness of the medium and thickness of the plate, respectively. With the circuit model of parallel planes, the voltage potential induced by the radial electromagnetic mode can be calculated by circuit simulation algorithm.

$$R = \frac{2}{\sigma t} + 2\sqrt{\frac{j\omega\mu}{\sigma}}$$

$$L = \mu d$$

$$C = \varepsilon \frac{\Delta x \Delta y}{d}$$

$$G = \omega C \tan \delta$$

Equation 1

Embodiments of modeling process 10 may analyze a via buried in the parallel planes and then model that as a lumped inductance and a resistance in series by connecting them to the RLGC network with dependent sources. See, e.g., *IEEE: Simulation and Modeling of Mode Conversion at Vias in Multilayer Interconnections*, Liaw et al, 1995.

Figure 2:
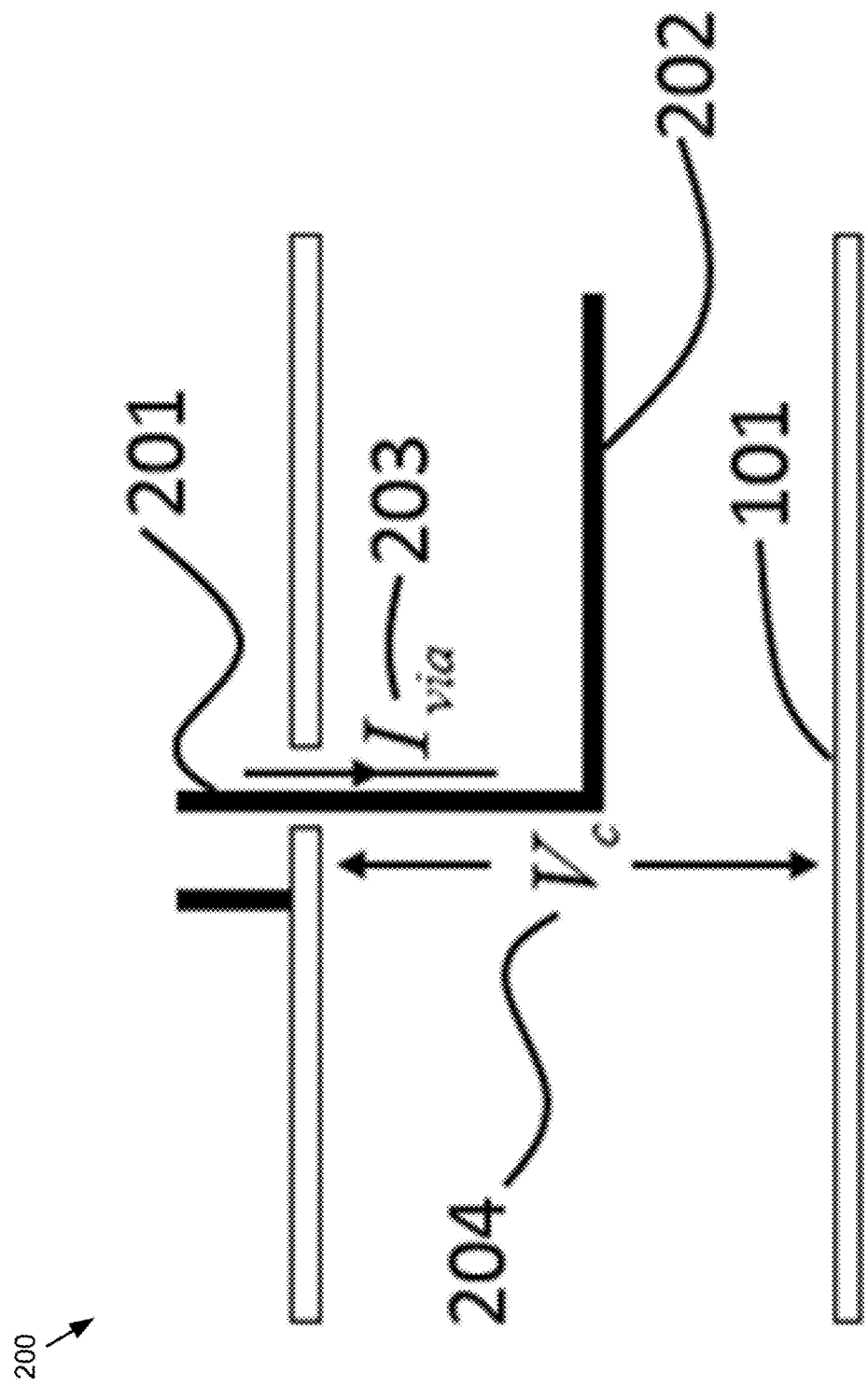
FIG. 2 is a diagram depicting aspects of the simulation process in accordance with an embodiment of the present disclosure.
Figure 3:
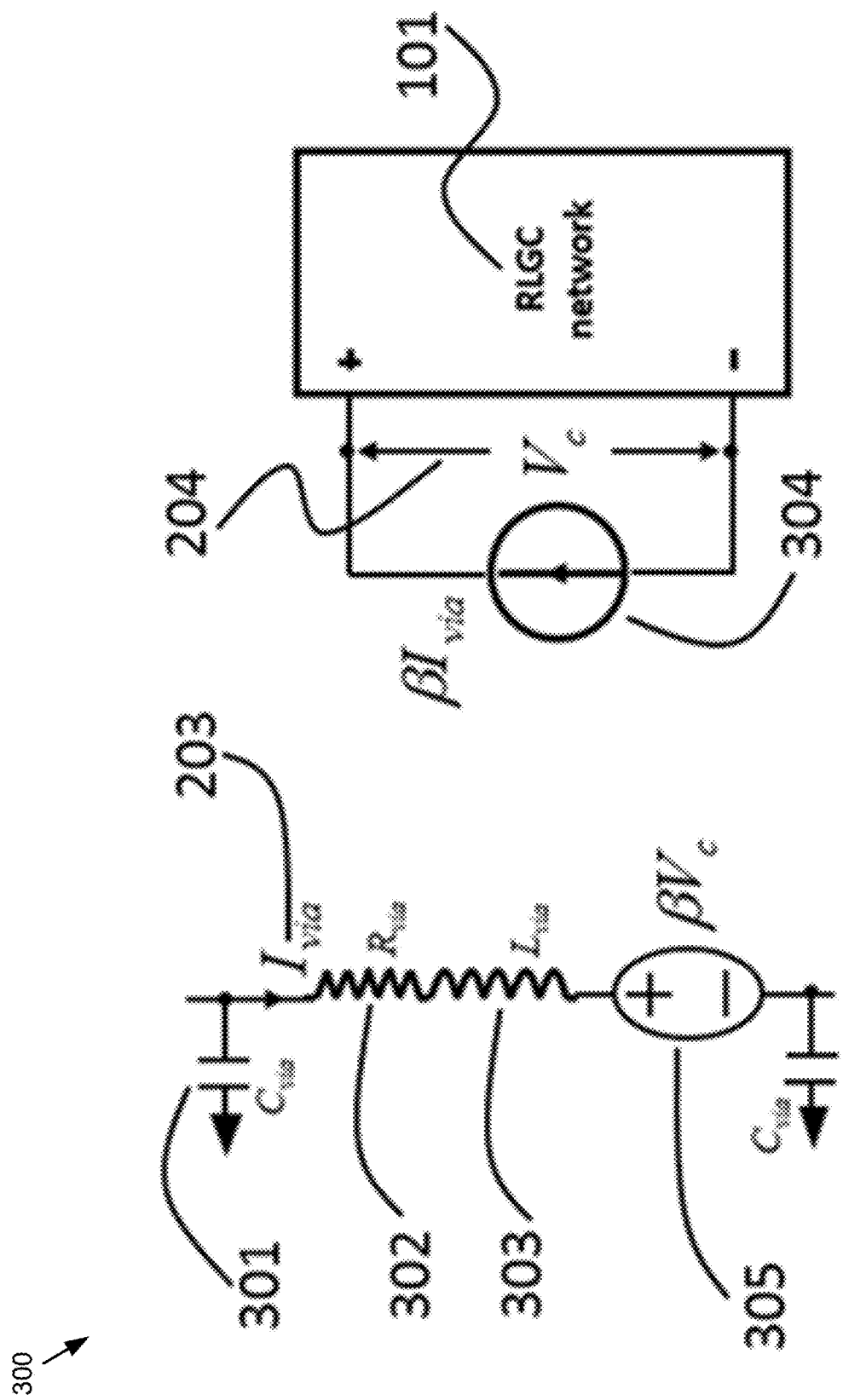
FIG. 3 is a diagram depicting aspects of the simulation process in accordance with an embodiment of the present disclosure.

Referring now to FIG. 2, an embodiment showing an example of the buried via is provided. In this example, the current I flowing through the via to signal trace is decomposed into a transmission line mode and a radial electromagnetic mode. The radial mode results in a voltage fluctuation spreading in the planes and the voltage fluctuation induces a current flowing back to the via. One example of the coupling process is shown in FIG. 3. The current of radial mode may be modeled by the current controlled-current source (CCCS). The voltage potential on the via induced by the voltage fluctuation may be realized by a voltage-controlled voltage source (VCVS). The two dependent sources share a same coupling coefficient β which can be calculated approximately using Equation 2 when the via is buried in a homogenous medium. The details of the coefficient can be seen in FIG. 4. For a through via without traces connecting to it, the excitation current of the radial mode in parallel planes may be equal to the via current, so the coupling coefficient is equal to 1.

$$\beta = \frac{d_{via}}{d}$$

Equation 2

In the via model, the dependent sources may be used to model the coupling between the field in parallel planes and the vias linked by external circuits. With two parasitic capacitances, the effects of anti-pad may also be modeled. All the parasitic parameters may be easily extracted from the electro-statics and magneto-statics solution. Finally, by linking signal vias, traces, external circuits and RLGC networks of parallel planes together with a common GND reference, the total solution of the packaged system can be solved by a sole SPICE simulator based on MNA.

Figure 5:
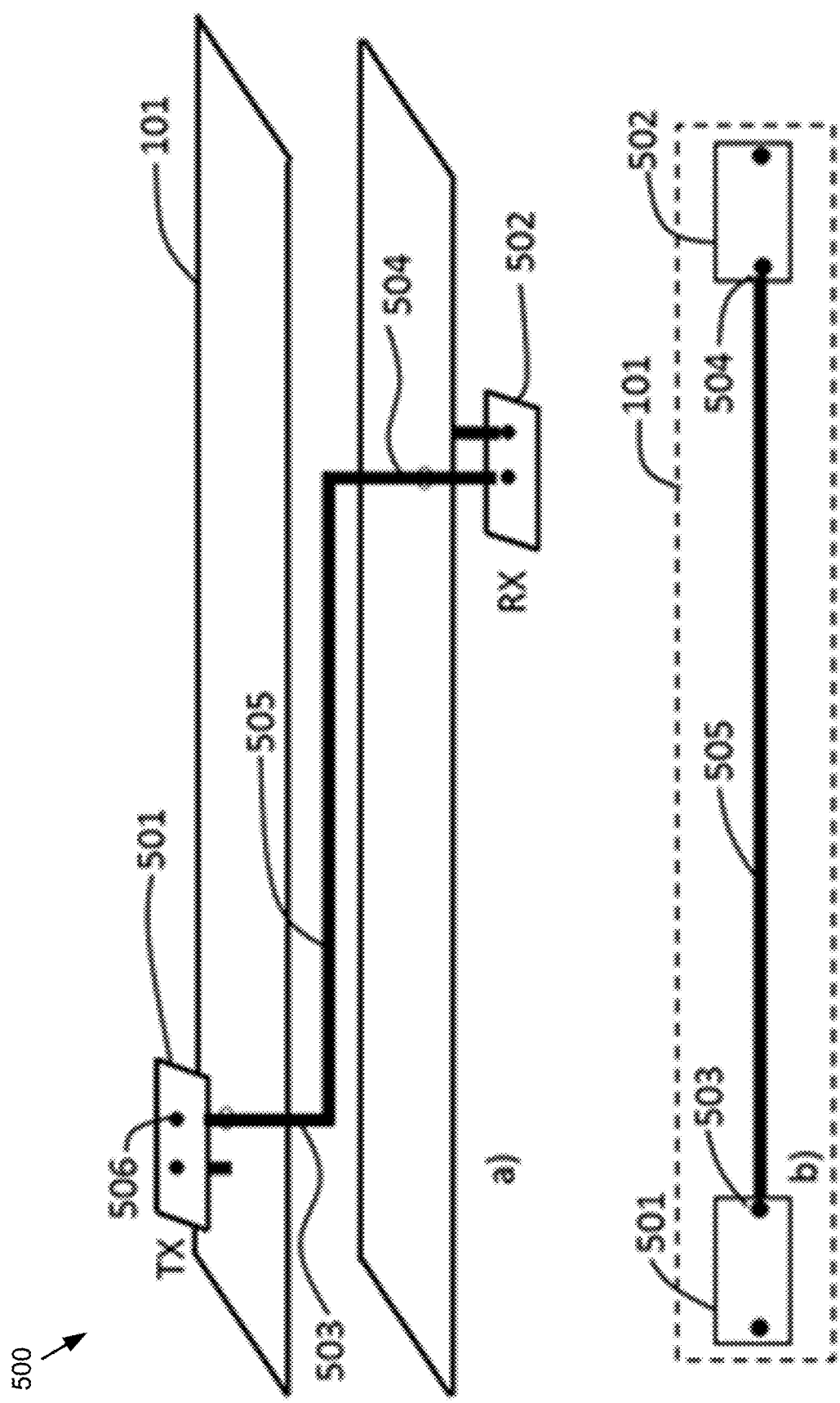
FIG. 5 is a diagram depicting aspects of the simulation process in accordance with an embodiment of the present disclosure.
Figure 6:
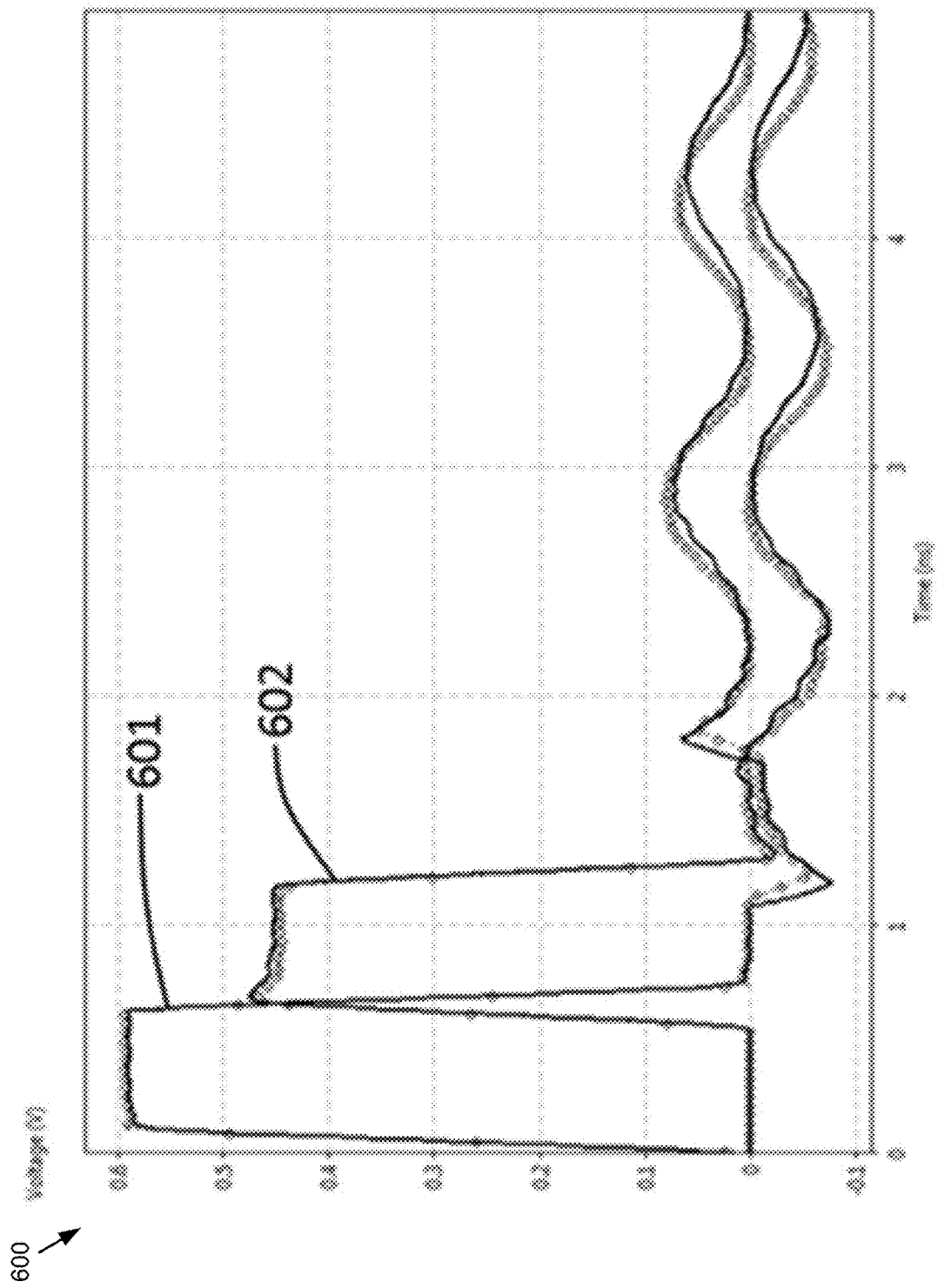
FIG. 6 is a diagram depicting aspects of the simulation process in accordance with an embodiment of the present disclosure.
Figure 7:
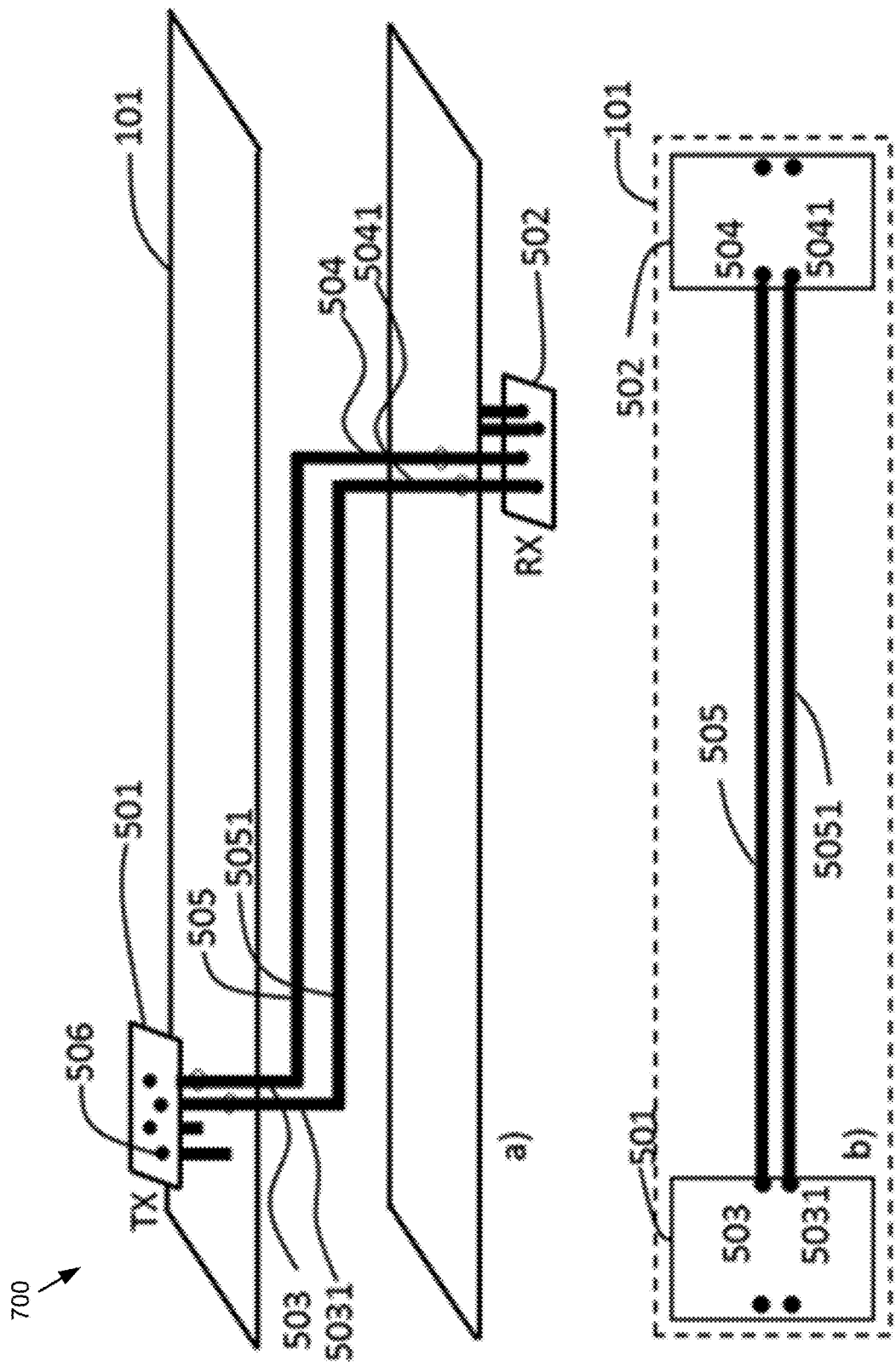
FIG. 7 is a diagram depicting aspects of the simulation process in accordance with an embodiment of the present disclosure.

Embodiments of modeling process 10 may be configured to calculate and analyze the signals in a via-trace-planes system using numerous approaches. Some of these may include the hybrid method based on a 2D FDTD algorithm and the full circuit methodology discussed herein. A single ended trace in the packaged structure is shown in FIG. 5 and the simulation results are plotted in FIG. 6. A coupled line structure in the same package is shown in FIG. 7 and its simulated results are plotted in FIG. 8. As shown in the Figures, embodiments of modeling process 10 provide accurate results.

Figure 9:
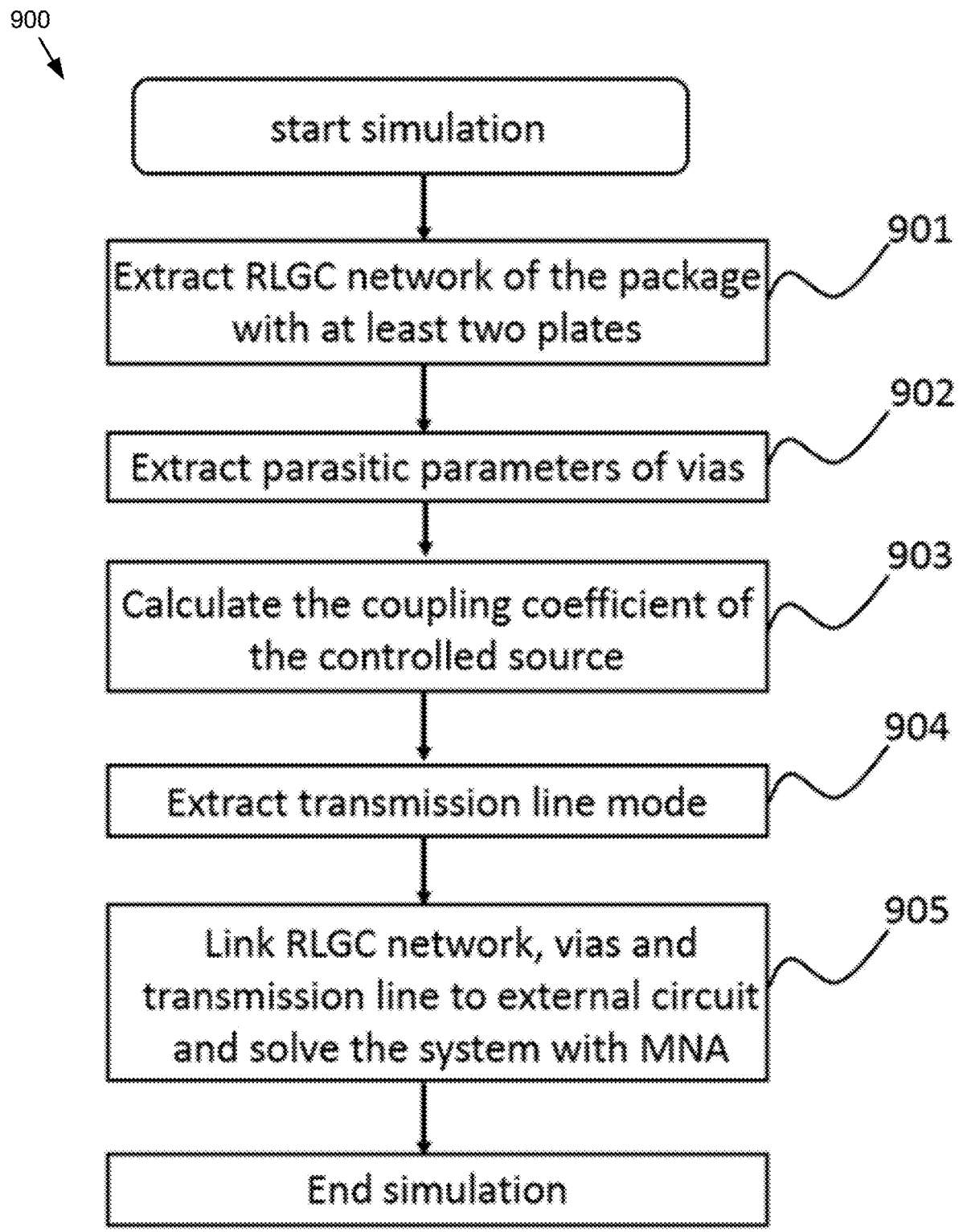
FIG. 9 is a flowchart depicting operations consistent with the simulation process of the present disclosure.

Referring now to FIG. 9, an embodiment showing a flowchart of operations consistent with modeling process 10 is provided. Modeling process 10 may be easily realized and integrated into circuit simulator. Each of these figures is discussed in further detail hereinbelow.

Referring again to FIG. 1, diagram 100 shows parallel metal planes 101. Diagram 100 also shows unit cell 102 of the parallel planes, the mesh size is denoted by Δx and Δy, and the distance of the two plates is shown as d. The equivalent circuit model of the unit cell 102 is also provided showing the inductance, resistance, conductance, and capacitance. More specifically, inductance 103, resistance 104, conductance 105, and capacitance 106. Local GND reference 107 of the unit cell is also provided.

Referring again to FIG. 2, diagram 200 shows a via 201 buried in a pair of parallel planes 101. A portion of the current of via 203 excites a radial electromagnetic mode in between the two planes. The radial electromagnetic mode propagates along the tangential direction of the signal trace 202 between the planes and induces a voltage drop 204. At the location of the via, the radial electromagnetic mode sees the via as a vertical conductor which may be parallel to its electric field, so a part of voltage 204 drops on the via 201.

Referring again to FIG. 3, diagram 300 shows the equivalent circuit for modeling the coupling between the via and parallel planes. The current flowing through the via section 203 and the voltage drop cross the equivalent circuit network 101 of parallel plates at the location of via is 204. The parasitic parameters of PI-typed via model are provided, denoting via capacitance 301, via inductance 303 and via resistance 302, respectively. The current flowing through the via may be coupled into the parallel planes by means of current controlling current source 304. On the other hand, the voltage fluctuation induced by the radial electromagnetic mode may also be coupled back to the via section by applying the voltage controlling voltage source 305. With these dependent sources, embodiments of modeling process 10 may model the coupling between via section and parallel planes.

Figure 4:
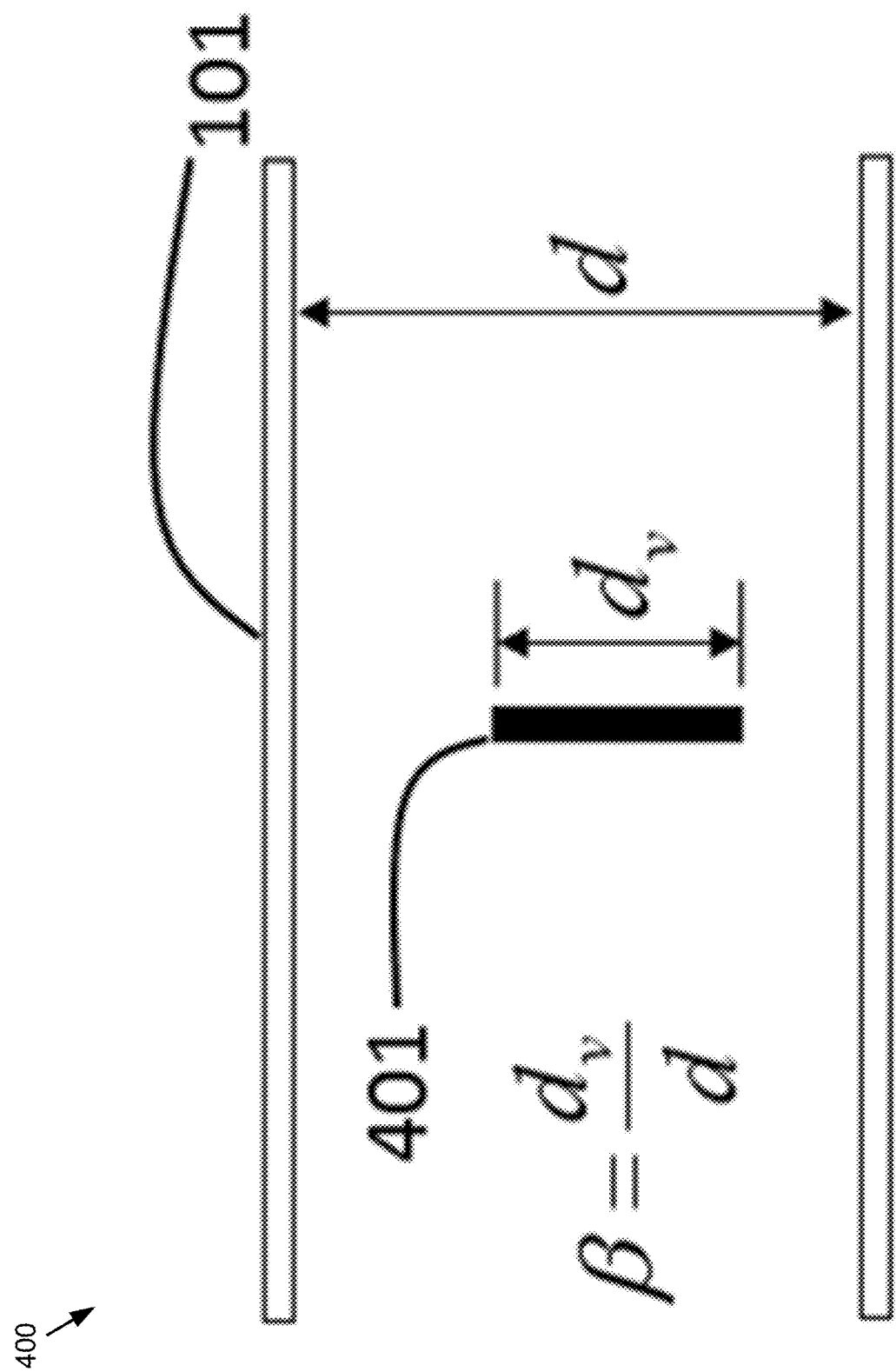
FIG. 4 is a diagram depicting aspects of the simulation process in accordance with an embodiment of the present disclosure.

Referring to FIG. 4, diagram 400 depicts an example of how to calculate the coupling coefficient β of a via 401 buried in a pair of parallel plates 101, approximately.

Referring again to FIG. 5, diagram 500 shows a single ended trace linked by two vias located in two parallel planes 101 for validating modeling process 10. In FIG. 5, a side view and a top view are shown. The package system includes external circuit, such as driver TX 501 and receiver RX 502, with pins 506 drawn on it. The interconnection may be composed by a signal trace 505 and two vias 504, 503. The waveforms of TX 601 and RX 602 are shown in FIG. 6. The solid curves may be calculated using a hybrid method while the dashed curves with circles are from the full circuit method. Both methods show much more consistency with respect to accuracy.

Figure 8:
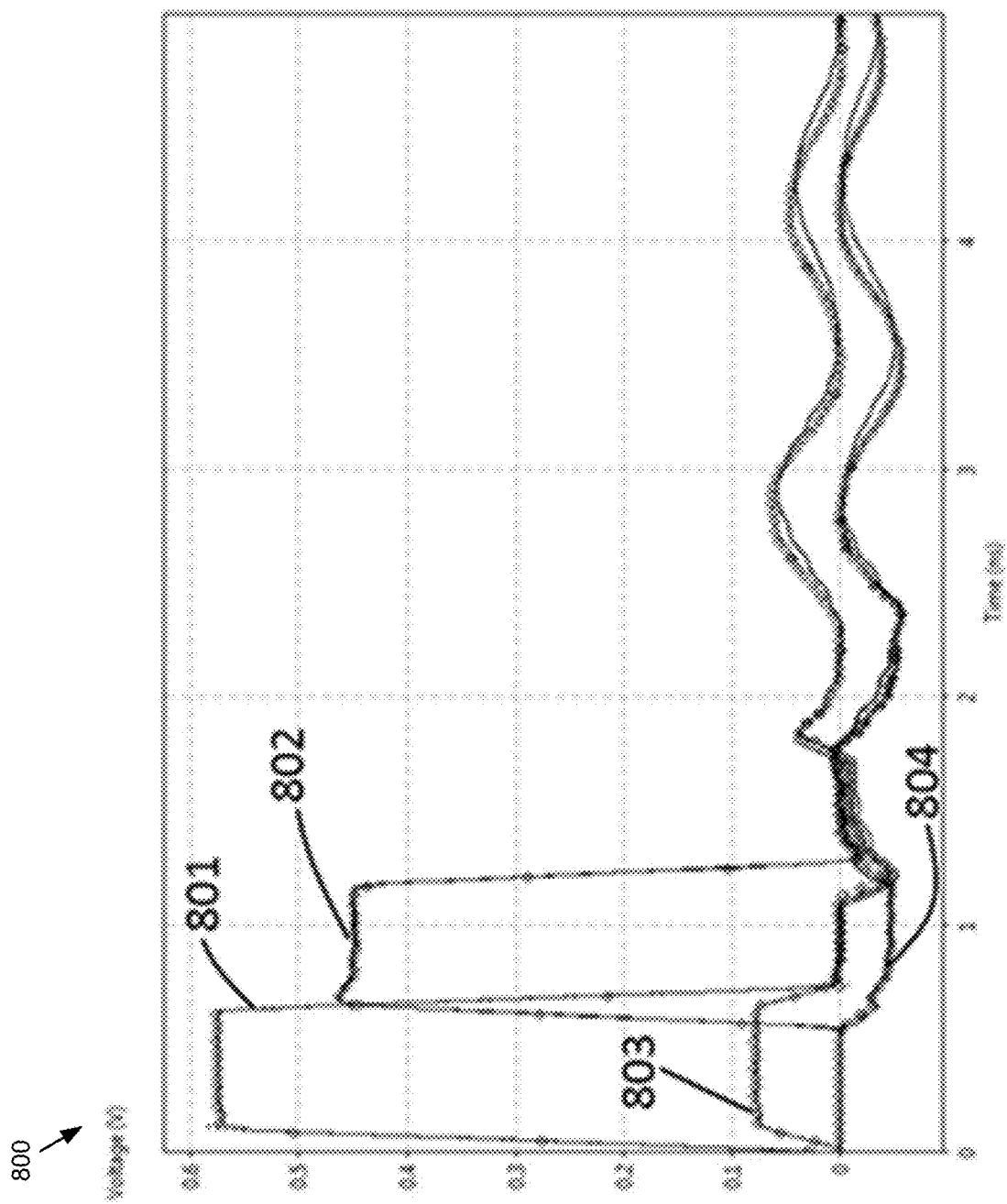
FIG. 8 is a diagram depicting aspects of the simulation process in accordance with an embodiment of the present disclosure.
Figure 12:
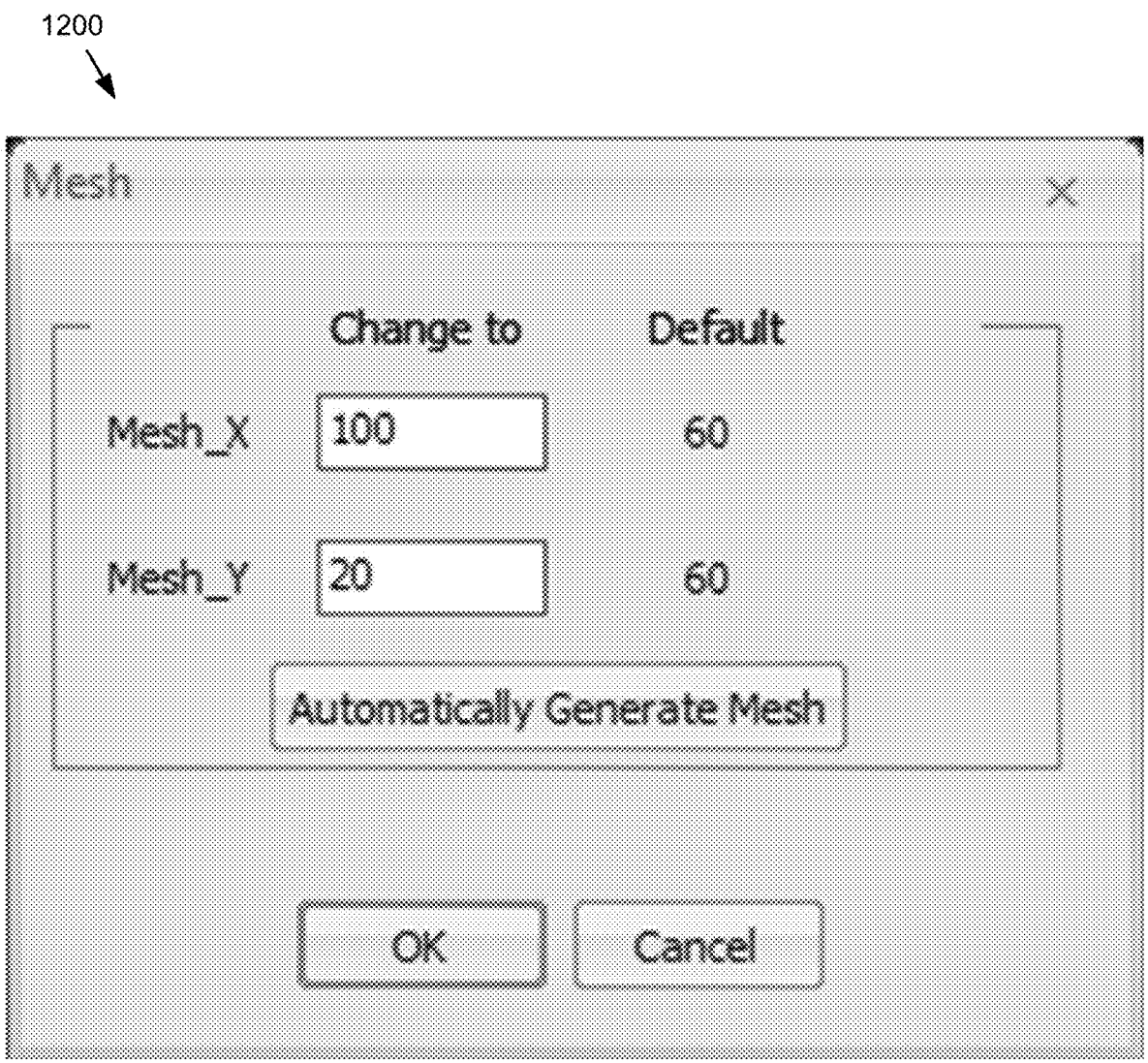
FIG. 12 is a diagram depicting a graphical user interface allowing for the setting of a mesh grid of "RLGC" network in GUI.
Figure 13:
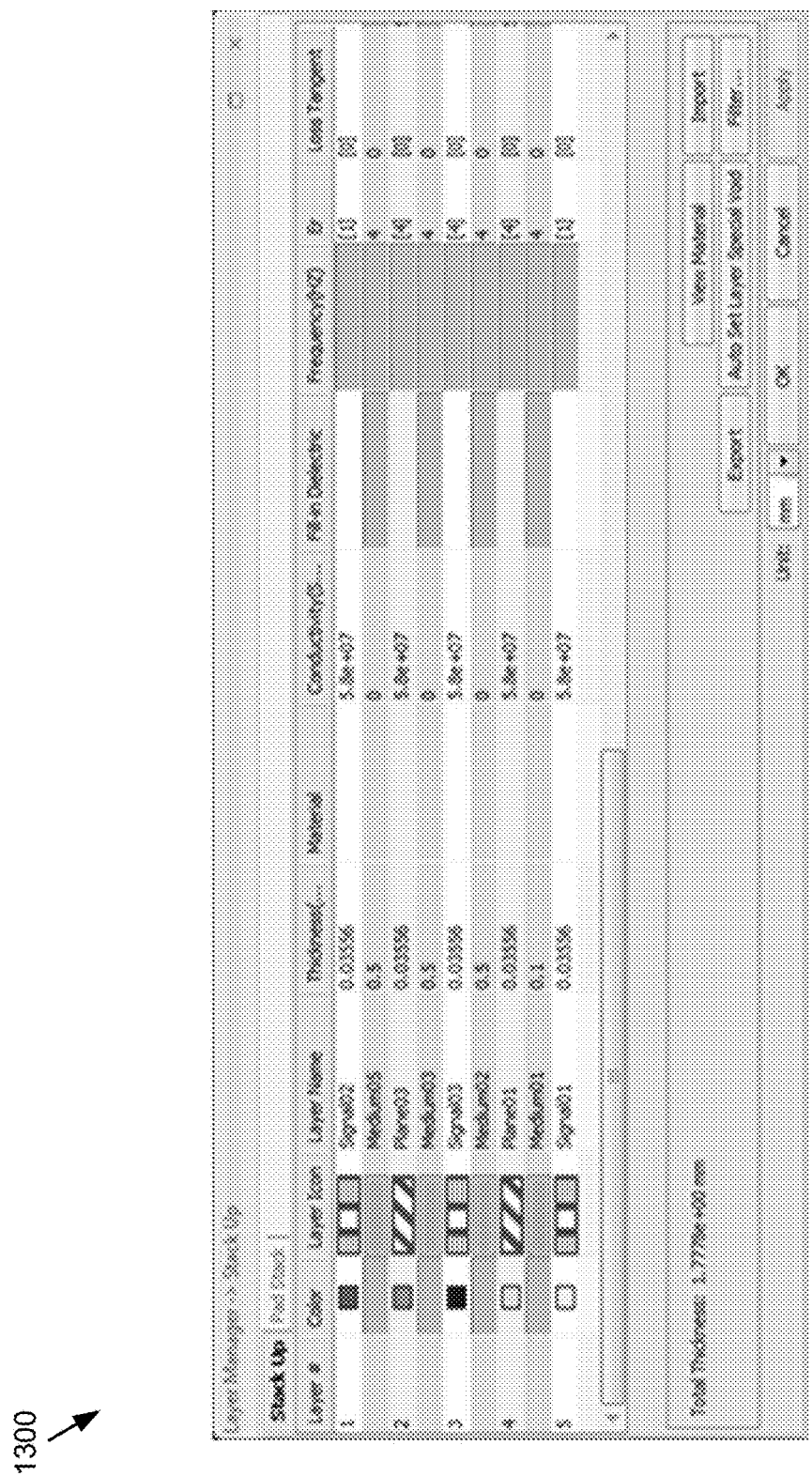
FIG. 13 is a diagram depicting a graphical user interface allowing for the setting of a stack-up in GUI.
Figure 14:
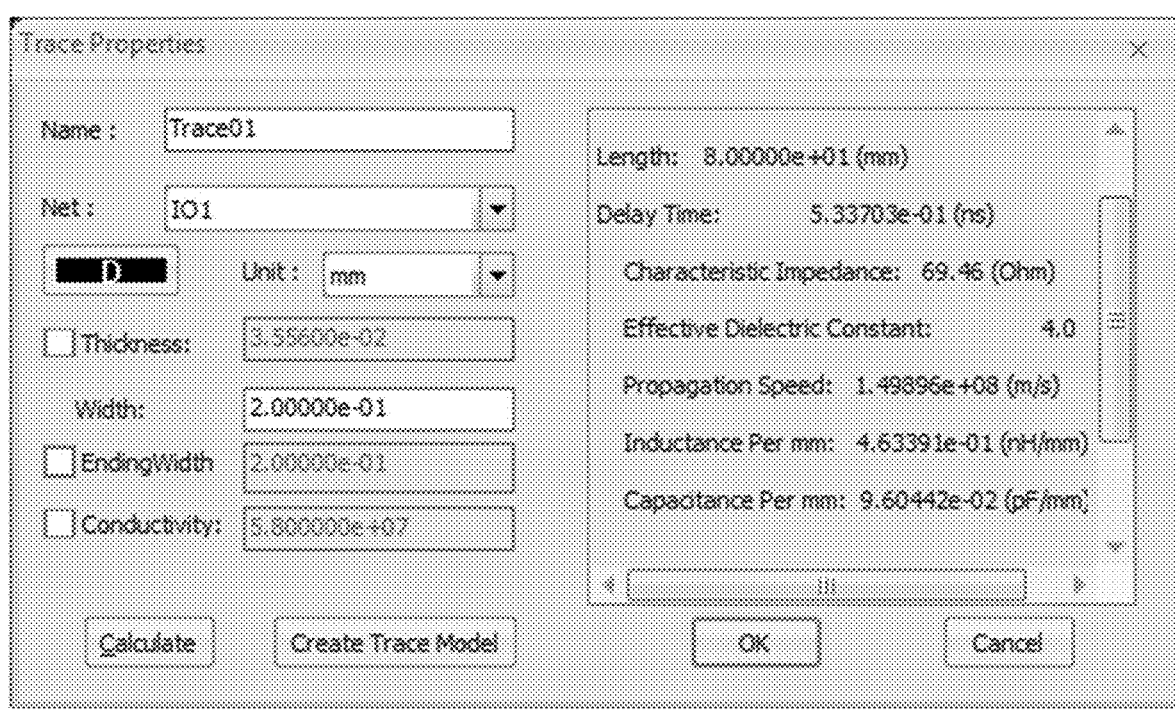
FIG. 14 is a diagram depicting a graphical user interface allowing for the setting of a transmission line in GUI.
Figure 15:
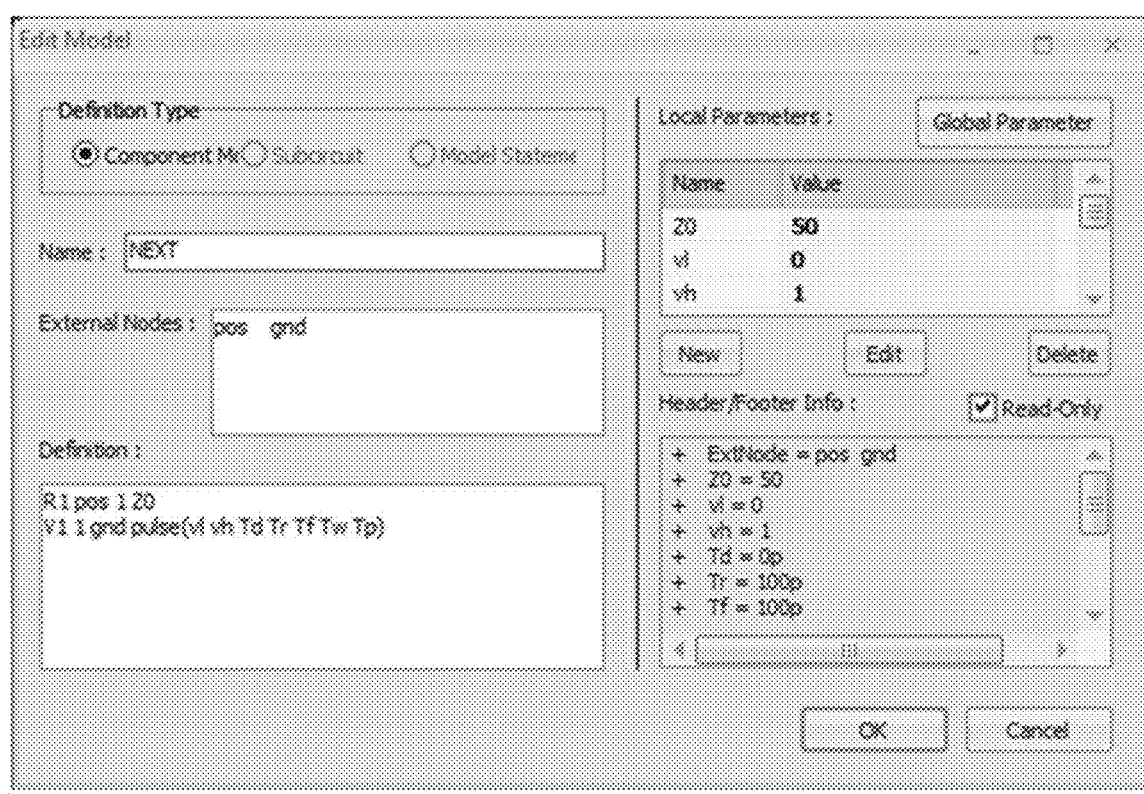
FIG. 15 is a diagram depicting a graphical user interface allowing for the setting of a TX-component in GUI.
Figure 16:
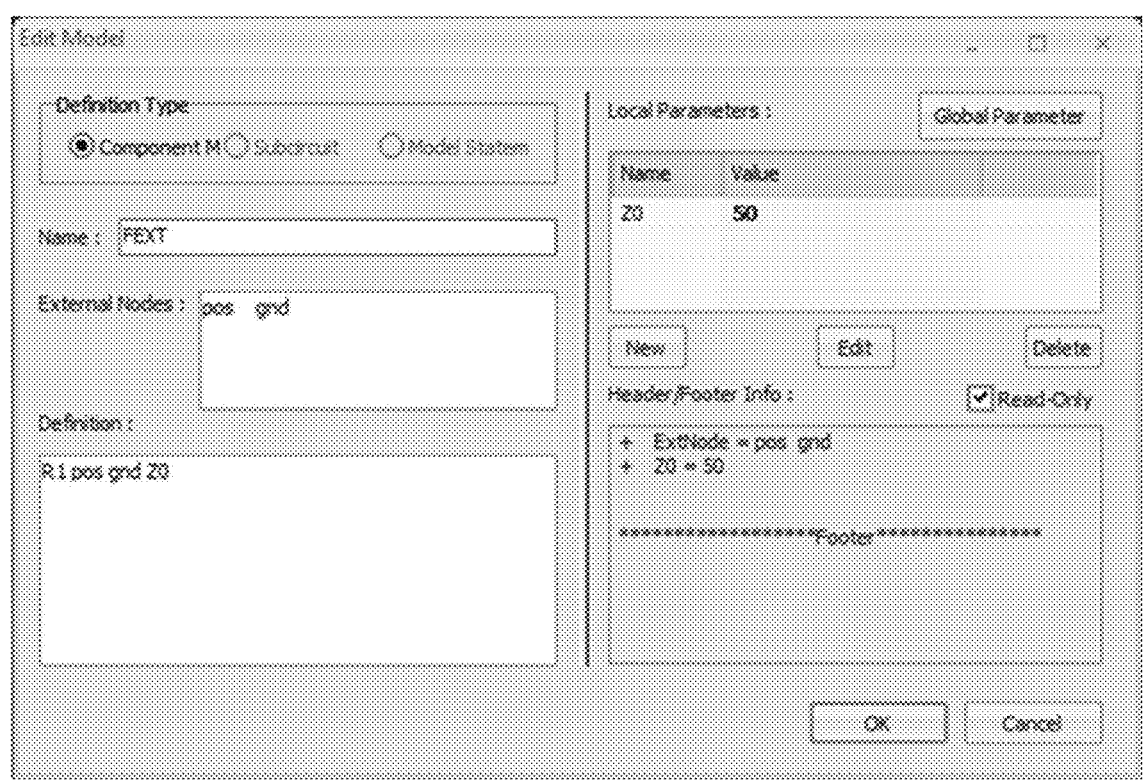
FIG. 16 is a diagram depicting a graphical user interface allowing for the setting of a RX-component in GUI.
Figure 17:
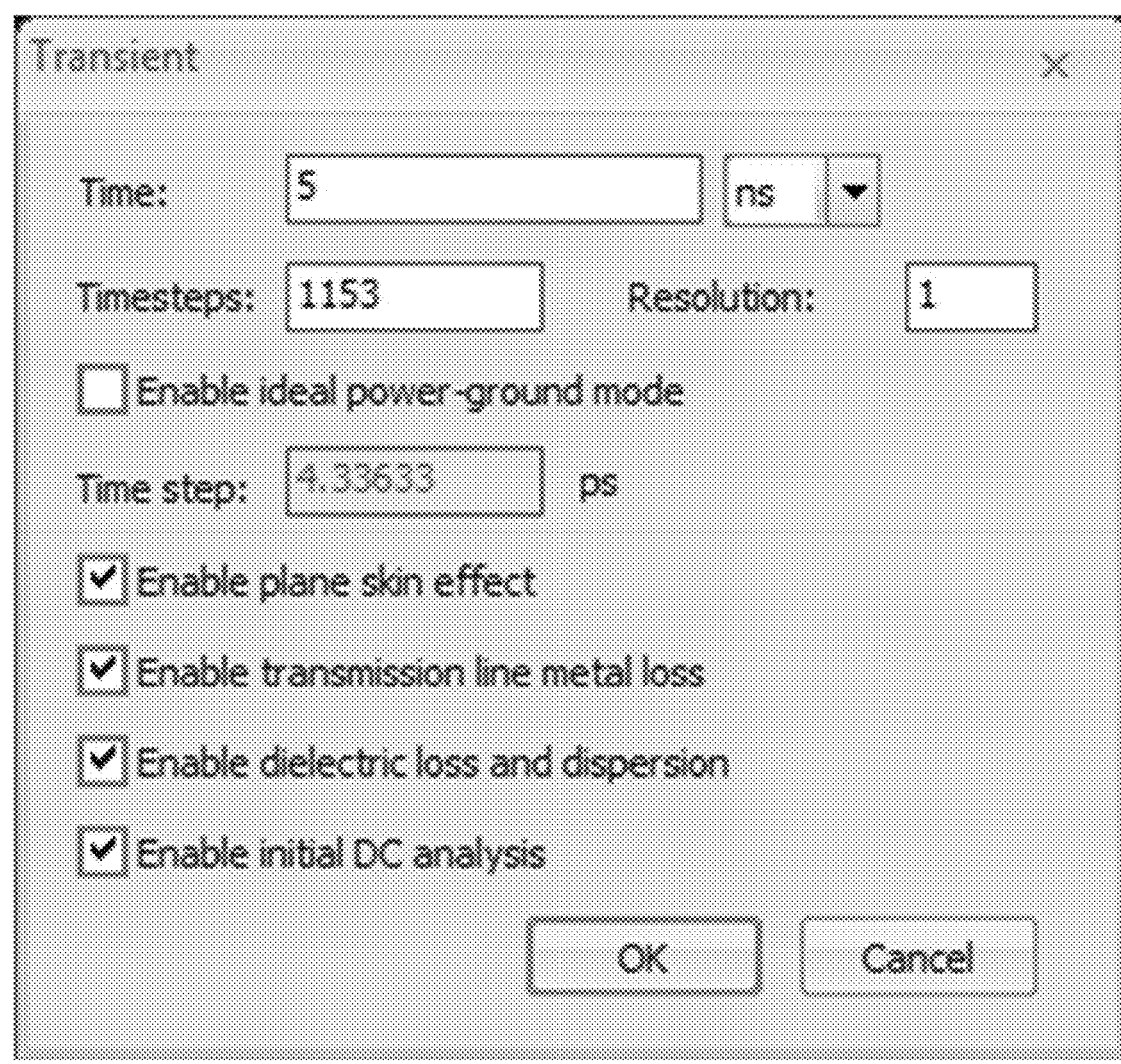
FIG. 17 is a diagram depicting a graphical user interface allowing for the setting of a transient simulation in GUI.

Referring again to FIG. 7, diagram 700 plots the interconnection composed by a pair of coupled strip lines 505 and 5051. Again, a side view and a top view are provided in diagram 700. Similar to FIG. 5, the coupled signal traces may be linked to both TX driver 501 and RX driver 502 by four signal vias, naming 503, 5031, 504 and 5041. In this system, the crosstalk may be induced by both coupled strip lines and the vias as the vias may excite and accept the voltage fluctuation between the parallel planes 101. In FIG. 8, diagram 800 plots TX 801, RX 802, NEXT 803 and FEXT 804 when strip 505 is an active line and strip 5051 is a victim line. The solid curves are calculated by the hybrid method while the dashed curves with circles are from the full-circuit of modeling process 10. The voltage fluctuation is considered in both methods, so they show much more consistency in accuracy for the coupled system. To obtain the results of FIG. 6 and FIG. 8, examples of graphical user interfaces that may be used by the designer are shown from FIGS. 12-17. FIG. 12 shows a GUI 1200 that allows a user to set a mesh grid setting for an RLGC network. FIG. 13 shows a GUI 1300 that allows a user to set a stack-up setting. FIG. 14 shows a GUI 1400 that allows a user to set a transmission line setting. FIG. 15 shows a GUI 1500 that allows a user to set a TX-component setting. FIG. 16 shows a GUI 1600 that allows a user to set a RX-component setting. FIG. 17 shows a GUI 1700 that allows a user to set a transient setting.

Referring again to FIG. 9, diagram 900 plots the flow chart of modeling interaction in multilayered electronic structures with the full-circuit method of modeling process 10. In some embodiments, modeling process 10 may provide the package with at least two parallel conductor planes and extract 901 the T-typed RLGC circuit model of unit cell. Modeling process 10 may then extract 902 PI-typed via model if the via is buried in between the parallel planes. Modeling process 10 may calculate 903 the coupling coefficients of the dependent sources according to Equation 2 shown above, approximately. Modeling process 10 may extract 904 the model parameter of the transmission line. In some embodiments, the W-element model may be applied. Modeling process 10 may model 905 the package system by linking the equivalent circuit model of parallel planes, vias, transmission lines and external circuits together with a common reference GND to solve the whole solution with the MNA.

Embodiments of modeling process 10 may provide a full-circuit method to analyze the solution in multilayered physical electronic structures. These structures may include at least two parallel metal planes, transmission lines and buried vias linked by the external circuit (drivers and receivers). Unlike the hybrid method with which the voltage fluctuation in between the planes is analyzed by 2D FDTD/FEM simulators, the voltage fluctuation in the new method is analyzed by the general SPICE simulator only.

Embodiments included herein may provide a method for extracting the circuit model of parallel planes by a set of distributed and stacked RLGC networks as shown in FIG. 1 above. The values of resistance, inductance, conductance and capacitance may be calculated using any suitable approach, such as that provided in Equation 1 above. Some or all of the extracted parameters may be recorded in the SPICE netlist as a sub-circuit model.

Embodiments of modeling process 10 provide a method for analyzing the coupling between buried vias and parallel planes. This may be modeled by the linkage of the two dependent sources (VCVS and CCCS) as shown in FIG. 3. The coupling coefficient may be approximated by Equation 2. The sub-circuit model of vias with dependent sources may be recorded in the SPICE netlist.

Embodiments of modeling process 10, as compared to the existing method, helps to reduce memory consumption, to shorten CPU time, and to avoid convergence issues in simulation.

Figure 10:
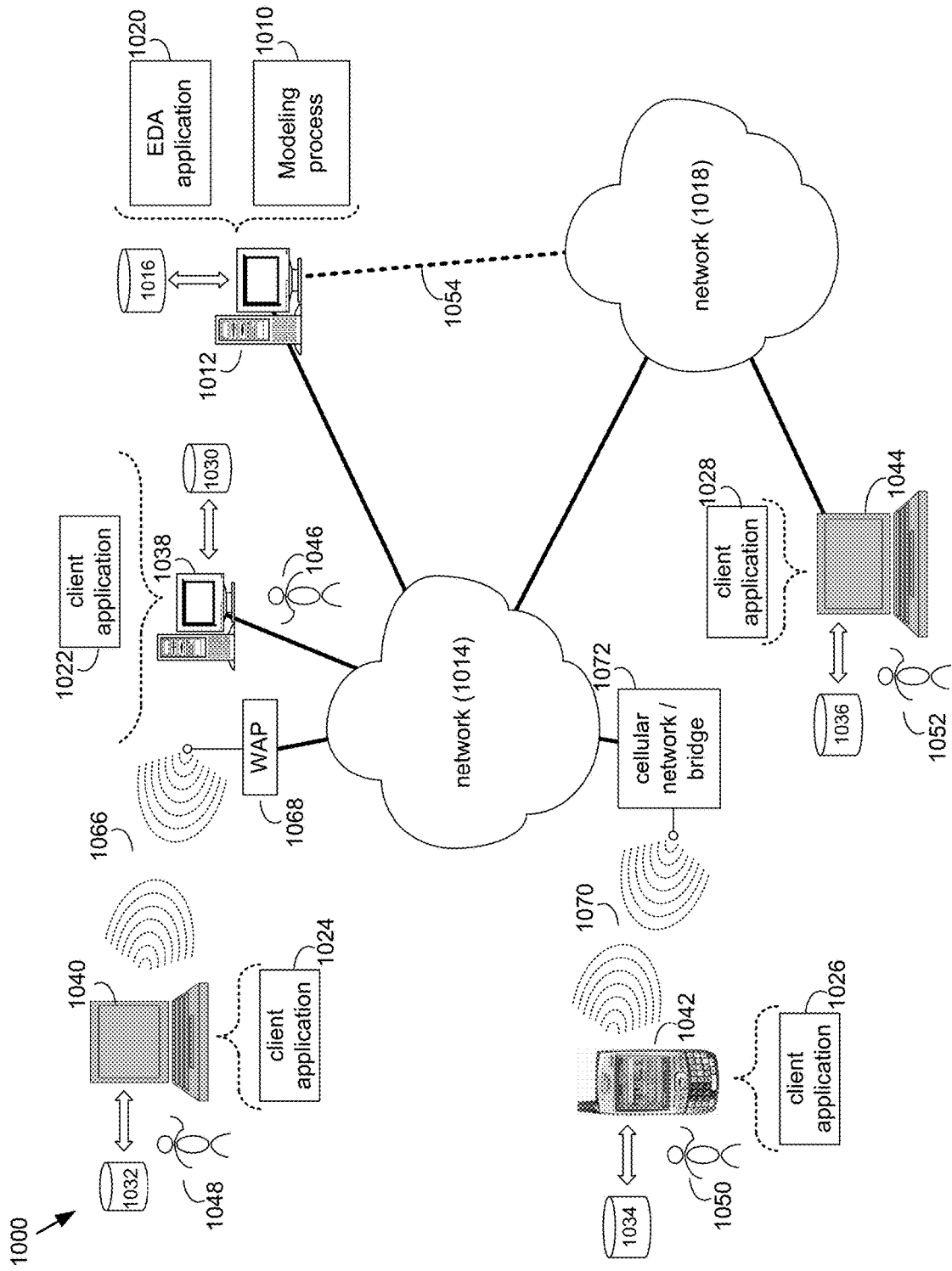
FIG. 10 is a diagram depicting aspects of the simulation process in accordance with an embodiment of the present disclosure.

Referring to FIG. 10, there is shown a modeling process 1010 that may reside on and may be executed by server computer 1012, which may be connected to network 1014 (e.g., the Internet or a local area network). Examples of server computer 1012 may include, but are not limited to: a personal computer, a server computer, a series of server computers, a mini computer, and a mainframe computer. Server computer 1012 may be a web server (or a series of servers) running a network operating system, examples of which may include but are not limited to: ANDROID™, iOS™, Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the modeling process may reside on and be executed, in whole or in part, by a client electronic device, such as a personal computer, notebook computer, personal digital assistant, or the like.

The instruction sets and subroutines of modeling process 1010, which may include one or more software modules, and which may be stored on storage device 1016 coupled to server computer 1012, may be executed by one or more processors (not shown) and one or more memory modules (not shown) incorporated into server computer 1012. Storage device 1016 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language ("HDL") files and/or any suitable files that may be associated with an electronic design.

Server computer 1012 may execute a web server application, examples of which may include but are not limited to: Microsoft IIS, Novell Webserver™, or Apache® Webserver, that allows for HTTP (e.g., HyperText Transfer Protocol) access to server computer 1012 via network 1014 (Webserver is a trademark of Novell Corporation in the United States, other countries, or both; and Apache is a registered trademark of Apache Software Foundation in the United States, other countries, or both). Network 1014 may be connected to one or more secondary networks (e.g., network 1018), examples of which may include but are not limited to: a local area network; a wide area network; or an intranet, for example.

Server computer 1012 may execute an electronic design automation (EDA) application (e.g., EDA application 1020), examples of which may include, but are not limited to those available from the assignee of the present application. EDA application 1020 may interact with one or more EDA client applications (e.g., EDA client applications 1022, 1024, 1026, 1028). EDA application 1020 may be referred to herein as a design tool.

Modeling process 1010 may be a stand alone application, or may be an applet/application/script that may interact with and/or be executed within EDA application 1020. In addition/as an alternative to being a server-side process, the modeling process may be a client-side process (not shown) that may reside on a client electronic device (described below) and may interact with an EDA client application (e.g., one or more of EDA client applications 1022, 1024, 1026, 1028). Further, the modeling process may be a hybrid server-side/client-side process that may interact with EDA application 1020 and an EDA client application (e.g., one or more of client applications 1022, 1024, 1026, 1028). As such, the modeling process may reside, in whole, or in part, on server computer 1012 and/or one or more client electronic devices.

The instruction sets and subroutines of EDA application 1020, which may be stored on storage device 1016 coupled to server computer 1012 may be executed by one or more processors (not shown) and one or more memory modules (not shown) incorporated into server computer 1012.

The instruction sets and subroutines of EDA client applications 1022, 1024, 1026, 1028, which may be stored on storage devices 1030, 1032, 1034, 1036 (respectively) coupled to client electronic devices 1038, 1040, 1042, 1044 (respectively), may be executed by one or more processors (not shown) and one or more memory modules (not shown) incorporated into client electronic devices 1038, 1040, 1042, 1044 (respectively). Storage devices 1030, 1032, 1034, 1036 may include but are not limited to: hard disk solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 1038, 1040, 1042, 1044 may include, but are not limited to, personal computer 1038, laptop computer 1040, mobile computing device 1042 (such as a smart phone, netbook, or the like), notebook computer 1044, for example. Using client applications 1022, 1024, 1026, 1028, users 1046, 1048, 1050, 1052 may access EDA application 1020 and may allow users to e.g., utilize modeling process 1010.

Users 1046, 1048, 1050, 1052 may access EDA application 1020 directly through the device on which the client application (e.g., client applications 1022, 1024, 1026, 1028) is executed, namely client electronic devices 1038, 1040, 1042, 1044, for example. Users 1046, 1048, 1050, 1052 may access EDA application 1020 directly through network 1014 or through secondary network 1018. Further, server computer 1012 (e.g., the computer that executes EDA application 1020) may be connected to network 1014 through secondary network 1018, as illustrated with phantom link line 1054.

The various client electronic devices may be directly or indirectly coupled to network 1014 (or network 1018). For example, personal computer 1038 is shown directly coupled to network 1014 via a hardwired network connection. Further, notebook computer 1044 is shown directly coupled to network 1018 via a hardwired network connection. Laptop computer 1040 is shown wirelessly coupled to network 1014 via wireless communication channel 1066 established between laptop computer 1040 and wireless access point (e.g., WAP) 1068, which is shown directly coupled to network 1014. WAP 1068 may be, for example, an IEEE 802.11a, 802.11b, 802.11g, Wi-Fi, and/or Bluetooth device that is capable of establishing wireless communication channel 1066 between laptop computer 1040 and WAP 1068. Mobile computing device 1042 is shown wirelessly coupled to network 1014 via wireless communication channel 1070 established between mobile computing device 1042 and cellular network/bridge 1072, which is shown directly coupled to network 1014. In some embodiments, modeling process 10 may be a cloud-based process as any or all of the operations described herein may occur, in whole, or in part, in the cloud or as part of a cloud-based system.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 1038, 1040, 1042, 1044 may each execute an operating system, examples of which may include but are not limited to ANDROID™, iOS™ Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

Figure 11:
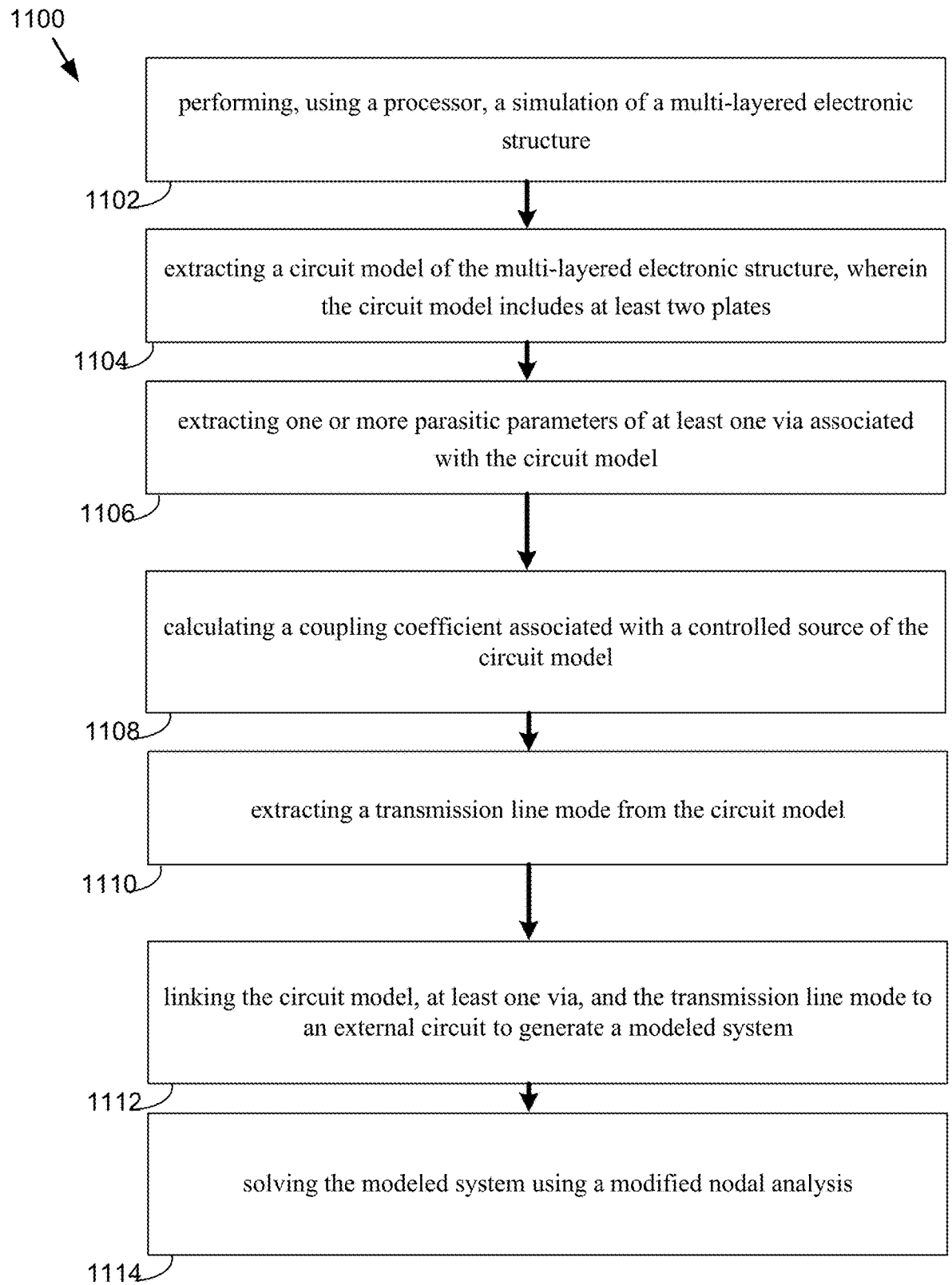
FIG. 11 is a flowchart depicting operations consistent with the simulation process of the present disclosure.

Referring now to FIG. 11, a method 1100 consistent with an embodiment of modeling process 1010 is provided. Embodiments may include performing 1102, using a processor, a simulation of a multi-layered electronic structure and extracting 1104 a circuit model of the multi-layered electronic structure, wherein the circuit model includes at least two plates. Embodiments may also include extracting 1106 one or more parasitic parameters of at least one via associated with the circuit model and calculating 1108 a coupling coefficient associated with a controlled source of the circuit model. Embodiments may further include extracting 1110 a transmission line mode from the circuit model and linking 1112 the circuit model, at least one via, and the transmission line mode to an external circuit to generate a modeled system. Embodiments may also include solving 1114 the modeled system using a modified nodal analysis.

In some embodiments, some or all of modeling process 1010 may be used to generate a computer readable storage medium, which may be used to fabricate or manufacture a physical electronic device such as the electronic packaging structures described herein. For example, once the modeled system has been solved and simulated (e.g., using SPICE, etc.), the computer readable storage medium, which may include the results of modeling process 1010, may be used as the basis for the manufacture of circuitry such as the electronic packaging structures described herein.

Accordingly, embodiments of modeling process 1010 may allow for the manufacture of electronic packaging structures that have fewer defects than those of prior systems. This results in a significant technological benefit over existing systems as electronic structures, that may include, but are not limited to, packages, PCB boards, drivers and receivers may be designed, simulated, and fabricated with high accuracy and efficiency resulting in less waste, reduced costs, and faster time from design to manufacturing.

In some embodiments, EDA application 20 and/or modeling process 10 may support a variety of languages and/or standards. EDA application 20 may support one or more software extensions and may be used in conjunction with one or more EDA tools such as those available from the Assignee of the subject application.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in an electronic design comprising:
performing, using a processor, a simulation of a multi-layered electronic structure;
extracting a circuit model of the multi-layered electronic structure, wherein the circuit model includes at least two plates;
extracting one or more parasitic parameters of at least one via associated with the circuit model, wherein a current controlled current source is coupled to the at least two plates to provide current to the at least one via;
calculating a coupling coefficient associated with a controlled source of the circuit model, wherein the coupling coefficient is based upon, at least in part, a thickness of a via and a thickness of a medium;
extracting a transmission line mode from the circuit model;
linking the circuit model, at least one via, and the transmission line mode to an external circuit to generate a modeled system;
determining a voltage fluctuation associated with the multi-layered electronic structure using a SPICE-based simulator, wherein the voltage fluctuation is coupled to the at least one via using a voltage controlled voltage source;
solving, using the SPICE-based simulator, the modeled system using a modified nodal analysis.

2. The computer-implemented method of claim 1, wherein the circuit model is a resistance, inductance, conductance, and capacitance ("RLGC") network.

3. The computer-implemented method of claim 1, further comprising:
storing one or more of the circuit model, the one or more parasitic parameters, the coupling coefficient, and the transmission line mode as a subcircuit model associated with a SPICE netlist.

4. The computer-implemented method of claim 2, wherein the RLGC network is analyzed as a distributed and stacked circuit network.

5. The computer-implemented method of claim 1, wherein the external circuit includes at least one of a driver and a receiver.

6. A non-transitory computer-readable storage medium having stored thereon instructions that when executed by a machine result in the following operations:
performing, using a processor, a simulation of a multi-layered electronic structure;
extracting a circuit model of the multi-layered electronic structure, wherein the circuit model includes at least two plates;
extracting one or more parasitic parameters of at least one via associated with the circuit model, wherein a current controlled current source is coupled to the at least two plates to provide current to the at least one via;
calculating a coupling coefficient associated with a controlled source of the circuit model, wherein the coupling coefficient is based upon, at least in part, a thickness of a via and a thickness of a medium;
extracting a transmission line mode from the circuit model; and
linking the circuit model, at least one via, and the transmission line mode to an external circuit to generate a modeled system; and
solving the modeled system using a modified nodal analysis.

7. The computer-readable storage medium of claim 6, wherein the circuit model is a resistance, inductance, conductance, and capacitance ("RLGC") network.

8. The computer-readable storage medium of claim 6, further comprising:
storing one or more of the circuit model, the one or more parasitic parameters, the coupling coefficient, and the transmission line mode as a subcircuit model associated with a SPICE netlist.

9. The computer-readable storage medium of claim 7, wherein the RLGC network is analyzed as a distributed and stacked circuit network.

10. The computer-readable storage medium of claim 6, further comprising:
determining a voltage fluctuation associated with the multi-layered electronic structure using only a SPICE-based simulator, wherein the voltage fluctuation is coupled to the at least one via using a voltage controlled voltage source.

11. The computer-readable storage medium of claim 6, wherein the external circuit includes at least one of a driver and a receiver.

12. A system for use in an electronic design comprising:
a computing device configured to perform, using a processor, a simulation of a multi-layered electronic structure and to extract a circuit model of the multi-layered electronic structure, wherein the circuit model includes at least two plates, the computing device further configured to extract one or more parasitic parameters of at least one via associated with the circuit model, wherein a current controlled current source is coupled to the at least two plates to provide current to the at least one via, the computing device further configured to calculate a coupling coefficient associated with a controlled source of the circuit model, wherein the coupling coefficient is based upon, at least in part, a thickness of a via and a thickness of a medium, the computing device further configured to extract a transmission line mode from the circuit model and to link the circuit model, at least one via, and the transmission line mode to an external circuit to generate a modeled system, the computing device further configured to solve the modeled system using a modified nodal analysis.

13. The system for use in an electronic design of claim 12, wherein the circuit model is a resistance, inductance, conductance, and capacitance ("RLGC") network.

14. The system for use in an electronic design of claim 12, further comprising:
storing one or more of the circuit model, the one or more parasitic parameters, the coupling coefficient, and the transmission line mode as a subcircuit model associated with a SPICE netlist.

15. The system for use in an electronic design of claim 12, wherein the RLGC network is analyzed as a distributed and stacked circuit network.

16. The system for use in an electronic design of claim 12, further comprising:
determining a voltage fluctuation associated with the multi-layered electronic structure using only a SPICE-based simulator, wherein the voltage fluctuation is coupled to the at least one via using a voltage controlled voltage source.

\* \* \* \* \*